Patented Sept. 1, 1953

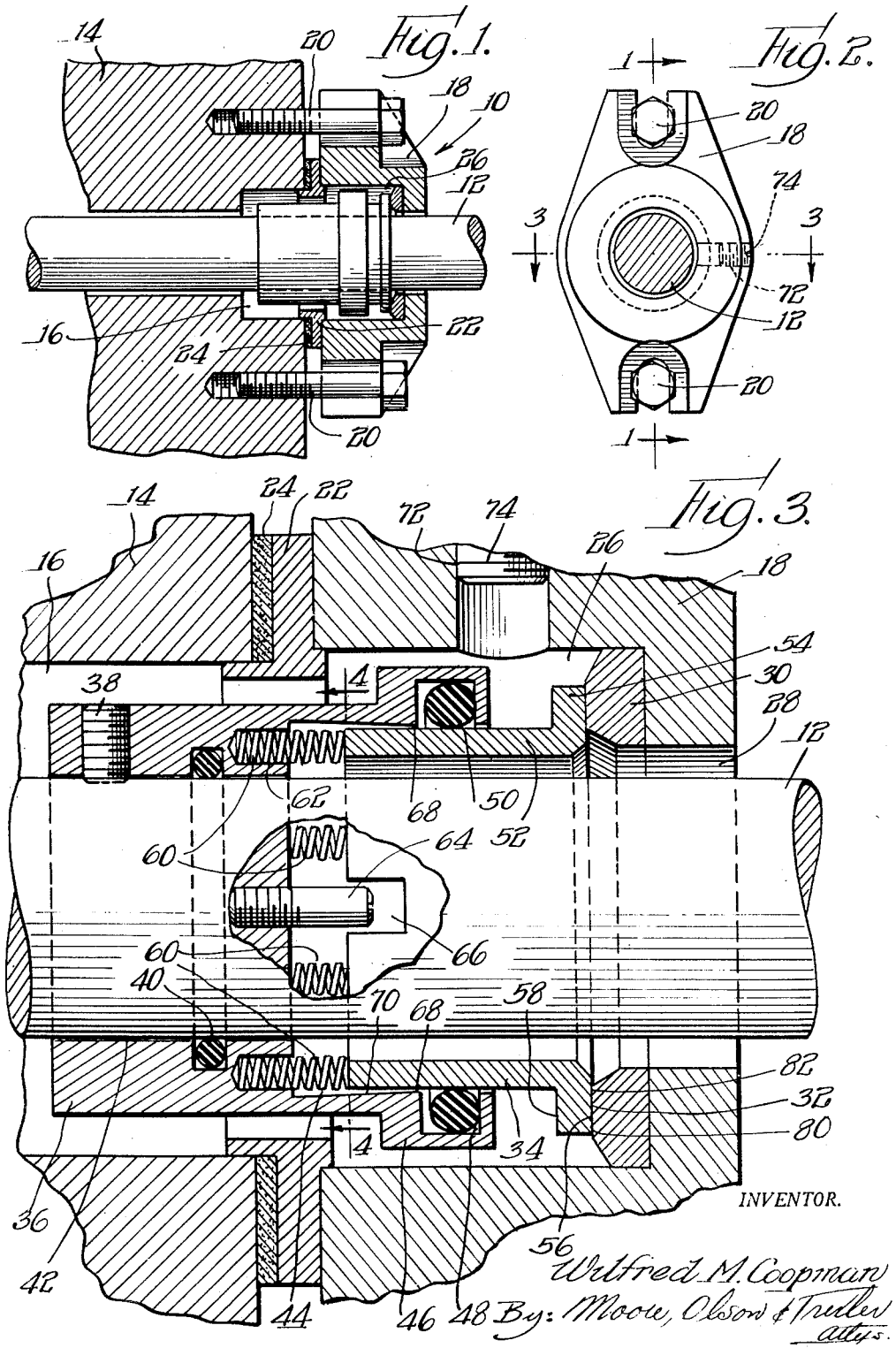

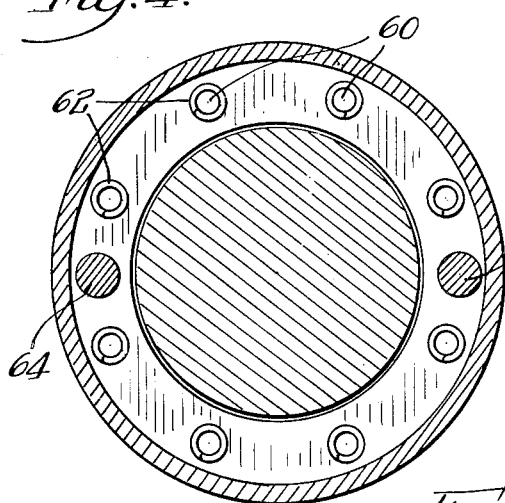
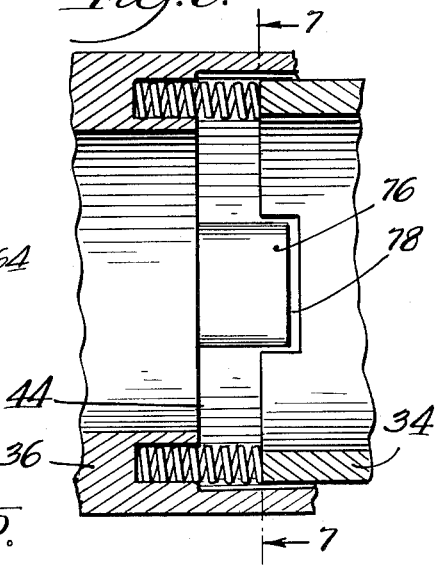
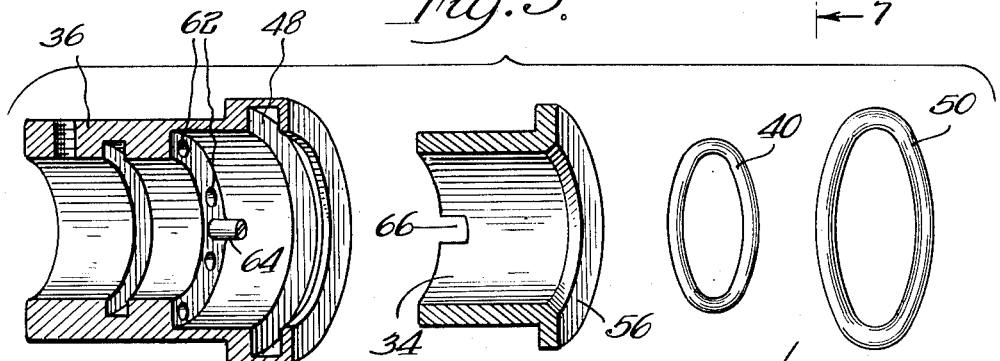
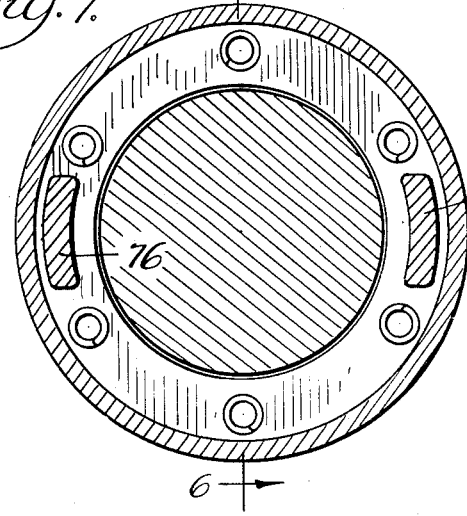
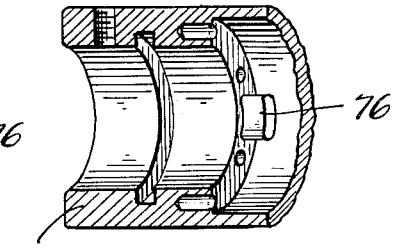

2,650,842

UNITED STATES PATENT OFFICE 2,650,842

SHAFT SEALING DEVICE

Wilfred M. Coopman, Los Angeles, Calif., assignor to Cassman Manufacturing Co., Lomita, Calif., a corporation of California Application December 16, 1948, Serial No. 65,709

6 Claims. (Cl. 286—11.15)

This invention relates to a seal for a rotary member. More particularly it relates to a seal of the type which includes a floating sleeve having a sealing surface, a member loosely attached to the floating sleeve and a third member having a sealing surface which cooperates with the sealing surface on said sleeve in a relatively rotating relationship.

Although a wide variety of such seals are known, none of them combine in one structure, reasonably long life, low manufacturing cost, simplicity in construction, adaptability to a variety of uses, ease of installation and adequate sealing effectiveness under adverse and dangerous conditions.

It is an object of this invention to provide a shaft seal structure of the foregoing type in which all the last named desirable characteristics are embodied.

A further object is to provide a structure of the foregoing type which is adaptable to both high and low pressure conditions.

Still another object is to provide a seal of the foregoing type which is readily installed in structures not specifically designed to receive it.

A still further object of this invention is to provide a seal of the foregoing type which is effective on all types of rotary and centrifugal pumps even when they are handling corrosive or inflammable fluids.

A still further object is to provide a seal of the foregoing type which seals effectively even when the rotary member involved is subject to end thrust, run-out, and/or other irregular movement.

It has now been found that the foregoing objects are accomplished by the structure illustrated in the accompanying drawings which form a part of this specification, and in which:

Fig. 1 is a view in cross-section on the line 1—1 in Fig. 2 through the wall of a housing showing a shaft projecting therethrough with a seal embodying the features of the present invention mounted on the shaft;

Fig. 2 is an end elevation of the structure shown in Fig. 1;

Fig. 3 is an enlarged detailed fragmentary view in cross-section on the line 3—3 of Fig. 2;

Fig. 4 is a view in cross-section on the line 4—4 in Fig. 3;

Fig. 5 is an exploded view in perspective and partly in cross-section, illustrating the elements of the seal structure shown in Fig. 1;

Fig. 6 is a fragmentary cross-sectional view similar to a portion of Fig. 3 but showing another embodiment of the invention;

Fig. 7 is a view in cross-section on the line 7—7 in Fig. 6; and

Fig. 8 is a view similar to a portion of Fig. 5 but illustrating the embodiment shown in Figs. 6 and 7.

In the embodiment of the invention illustrated in Fig. 1 the shaft seal, designated generally 10, which forms the subject matter of this invention is shown mounted upon a shaft 12 and the wall of a housing 14 through which the shaft 12 extends. The housing 14 may be a pump housing or any other kind of housing in connection with which a shaft seal is desirable. In the embodiment shown in Fig. 1 the shaft seal 10 is shown embodied in a structure which was not specifically designed to receive it, and while the stuffing box 16 provided for the previous sealing means is utilized the seal is also provided with a seal housing 18 which is bolted or otherwise fastened to the wall 14 by bolts such as the bolts 20.

For the purpose of insuring that the housing 18 will be properly supported with respect to the stuffing box 16 and the shaft 12 an adapter ring 22 is clamped between the housing 18 and the wall 14. The adapter ring 22 is provided with a gasket 24 which abuts the face of the housing 14 to prevent leakage at this point.

As suggested above, the stuffing box 16 is utilized to provide part of the chamber in which the sealing elements are mounted, the remainder being provided by the chamber 26 within the housing 18. The shaft 12 as may be seen passes through the stuffing box 16, the chamber 26 and through an opening 28 provided in the end wall of the housing 18. Surrounding this opening 28 in the chamber 26 is an annular bronze wearing ring 30 which may be, for example, sweated in place in the housing 18. This wearing ring 30 provides the stationary sealing surface 32 of the seal.

As shown in Fig. 3 a floating sleeve 34 is supported in position to cooperate with the wearing ring 30 by a collar 36 which is fixed to the shaft 12 by suitable means such as the set screw 38. Suitable packing such as the O-ring sealing member 40 is provided between the collar 36 and shaft 12 to prevent leakage along the shaft past the collar 36. Still referring to Fig. 3 it will be seen that in addition to the opening 42 in the collar 36 in which the shaft 12 extends the collar 36 is provided with a counterbore 44 to receive the floating sleeve 34. In order to seal between the sleeve 34 and the collar 36 the latter is provided with an annular enlarged portion 46 adjacent the end in which the sleeve 34 extends and this annular enlarged portion 46 in turn has an annular groove 48 formed therein. Mounted in this groove 48 is an O-ring packing member 50 which is compressed between the inner wall of the collar 36 in the groove 48 and the outer wall of the sleeve 34 to provide the desired seal between the two parts.

The floating sleeve 34 as shown consists in general of a hollow cylindrical portion 52 provided on the end outside the collar 36 with an annular flange 54 extending radially outwardly from the cylindrical portion 52. This flange 54 serves at least two purposes. In the first place, its outer end face is ground and lapped very accurately to provide a sealing face 56 which cooperates with the sealing face 32 on the wearing ring 30. Preferably the sealing face 56 is formed of a hard facing material such as for example Stellite so that it will stand up under extreme temperature, abrasives, poor lubrication and the like. The second purpose served by the flange 54 is to provide a surface 58 which is subject to the fluid pressure against which the seal is to operate so that the force with which the sleeve 34 is urged against the wearing ring 30 is largely supplied by the pressure of the fluid to the end that the force is greater where the pressure of the fluid is higher, and vice versa.

Although most (under normal operating conditions preferably substantially all) of the force urging the sleeve 34 against the wearing ring 30 is supplied by the fluid under pressure against which the seal is operating, means in the form of a plurality of springs 60 which also urge the sleeve 34 against the ring 30 are provided. These springs 60 extend in a plurality of openings 62 spaced about the end wall of the counter-bore 44 as best seen in Figs. 4 and 5. Referring back to Fig. 3 it is seen that the springs 60 are compressed between the bottoms of the openings 62 and the end of the cylindrical portion 52 of sleeve 34 and that they urge the sleeve 34 toward the bronze wearing ring 30. In the embodiment shown the extent to which the springs 60 press sleeve 34 against the wearing ring 30 will depend upon the positioning of the collar 36 on the shaft 12. Preferably this collar is so positioned that the springs 60 exert just sufficient force on the sleeve 34 to maintain it in engagement with the ring 30 when there is no pressure on the seal so that under normal operating conditions substantially the entire force urging the sleeve 34 into sealing engagement with the ring 30 is provided by the fluid under pressure which the seal is required to retain.

To avoid having to drive the floating sleeve 34 for rotation with the shaft 12 through engagement with the O-ring 50 of the sleeve 34, driving means in the form of pins 64 are provided. These pins are threaded into the end of the counterbore in the collar 36 or otherwise secured therein or formed thereon to extend down into a cooperating slot 66 provided in the sleeve 34. This method of connecting the sleeve 34 and the collar 36 for rotation together leaves the sleeve free to undergo irregular movement with respect to the collar 36 and to move axially with respect to the collar 36 while at the same time insuring that the sleeve 34 will be caused to rotate with the collar 36 and thus with the shaft 12. Preferably as illustrated in Fig. 4 two driving means such as the pins 64 are provided at diametrically opposite points.

One of the important characteristics of the seal which forms the subject of the present invention is its capacity to seal effectively even under adverse conditions, particularly when the shaft such as the shaft 12 is subject to severe end thrust and run-out. This is in considerable part at least achieved by utilizing the O-ring 50 to seal between the collar 36 and the sleeve 34 and by providing adequate clearance between the sleeve 34 and the shaft 12 and between the sleeve 34 and the wall of the collar 36 in the counter-bore 44. Applicant has found, however, that adequate sealing between the collar 36 and the sleeve 34 by use of the O-ring 50 is not obtained unless the clearance between the outer surface of the sleeve 34 and the inner surface of the collar 36 adjacent the groove 48 as at 68 is kept at a minimum, that is, at a value lower than is permissible elsewhere between the juxtaposed areas of the sleeve and collar. Accordingly, the clearance between the sleeve 34 and the collar 36 adjacent the groove 48 as indicated by the numeral 68 is preferably held within close tolerances, the exact clearance varying with the size of the seal and the wall 70 of the collar 36 is relieved as shown in Fig. 3, preferably in a gradually increasing amount from adjacent the groove 48 toward the end wall of the counter-bore 44. For example, in a seal for a one-inch shaft it has been found that a clearance at 68 of about .004 of an inch is desirable, and that for a three-inch diameter shaft a clearance of about .012 of an inch gives very good results.

Occasionally it is desirable to flush out the space surrounding the sleeve 34 and the collar 36 within the housing 18 and in the stuffing box 16, and to this end the housing 18 is drilled and tapped as at 72 and the opening so formed is closed with a threaded and thus removable plug 74.

Figs. 6, 7 and 8 illustrate an alternative construction which is designed for use where high pressure is involved. To seal against high pressure it is necessary to press the sleeve 34 against the wearing ring 30 with very substantial force, and this in turn increases the resistance to turning of the sleeve 34 which results from the engagement between the surfaces 32 and 56. This increases the tendency to shear off pins such as the pins 64 and accordingly these are replaced in the embodiment shown in Figs. 6, 7 and 8 with annularly elongated projections 76 which have the cross-sectional area indicated in Fig. 7. These may, for example, be formed separately and press fitted into correspondingly shaped slots in the wall of the counter-bore 44. To accommodate these larger projections 76 corresponding larger slots 78 are provided in the end of the sleeve 34.

While the invention has been illustrated by an embodiment in which the seal is located within the housing from which escape of fluid is to be prevented and in which the floating sleeve rotates, it should be understood that it is applicable to seals designed to be placed either in or outside of the housing containing the fluid under pressure, and that it is likewise applicable to seals in which the floating sleeve is stationary and the wear ring rotates or seals for mechanisms in which the shaft is stationary and the member surrounding it rotates. The manner in which applicant's seal structure can be varied to accommodate it to all these various uses will be readily understood by those skilled in the art. Similarly, although the seal shown is one designed to be used with a shaft mounting not specifically designed to accommodate the seal, it will be apparent that a shaft structure can be readily provided in which various parts of the seal are integral with the shaft and housing through which the shaft passes.

It is preferred for best results that the floating sleeve telescope within the annular member such as 36 or 30 to which it is non-rotatably connected. However, it is within the scope of the invention to have the annular member extend inside the floating sleeve.

It has been found to be highly desirable to employ a plurality of annularly spaced spring means to urge the sleeve 34 into sealing engagement, but the invention is not intended to be limited to the use of eight spring means or even six as shown in Fig. 7. It is, however, desirable that the spring means be small in diameter as compared with the diameter of the shaft and that they be placed close to the shaft surface to minimize the extent to which the springs are compressed for a given angularity between the axis of the sleeve 34 and the axis of the collar 36. This contributes to the utilization of the fluid pressure as substantially the entire force pressing the sleeve 34 against the wearing ring 30 under normal operating conditions.

Means such as the groove 48 is preferred for maintaining the O-ring in sealing position between the sleeve 34 and the collar 36. In the embodiment shown the groove 48 is slightly longer axially than the diameter of the O-ring 50. This permits the O-ring 50 to roll with axial movement between the sleeve 34 and the collar 36 and minimizes wear on the surface of the O-ring even when the O-ring is pressed into a slightly oval shape by the compression between the surface of the sleeve 34 and the collar 36 in the bottom of the groove 48. It should be understood, however, that the invention is not limited to the use of a groove 48 such as is shown in the drawings. Any desired means may be used for maintaining the O-ring in place, and more specifically a groove of different cross-sectional shape than that of the groove 48 may be used. For example, the groove may be V-shaped in cross-section or may be of the same axial length as the cross-sectional diameter of the O-ring or may be slightly rounded on the bottom or the groove may be even wider axially relative to the cross-sectional diameter of the O-ring 50 than is the groove 48. Any of a wide variety of materials may be employed in forming the sealing surfaces 32 and 56. Preferably one, such as the surface 56 will be much harder and more wear resistant than the other 32, so that wear will take place entirely on one member which can be replaced. Very satisfactory results have been obtained when the wear ring 30 is formed of "Bearium" bronze, which includes finely dispersed particles of lead giving frictional coefficient comparable to Babbitt metal but with the strength of bronze. Alternatively, the wearing ring 30 may be made of various other suitable metals, such as for example carbon. The O-rings 40 and 50, more particularly the O-ring 50 is preferably made of synthetic rubber-like material such as "Hycar," neoprene or silastic rubber or the like, although they may be formed of other materials if desired.

The structure illustrated in the drawings is readily adaptable to a variety of different pressure conditions. For example, by relieving the wearing ring 30 at 80 to reduce the area of the surface 32 which is in contact with cooperating sealing surface 56 the total area of contact that may be reduced thereby decreasing the frictional resistance to turning between the surface 32 and the surface 56 and also exposing a portion of the sealing surface 56 on the sleeve 34 to the fluid pressure thereby counteracting to some extent the force exerted by pressure of the fluid against the surface 58. Alternatively, by relieving the wearing ring at 82 the area of engagement of the sealing surfaces is reduced without exposing any part of the sealing surface 56 to the fluid under pressure or in any event without increasing the area of the surface 56 which is exposed to fluid under pressure. It will also be apparent that the radial width of the flange 54 can be varied within the scope of the invention, thus changing the total force in pounds driving the sleeve 34 into sealing engagement and/or increasing the area of contact of the sealing surfaces. These characteristics, together with that described above that the force supplied by the springs can be controlled make it possible to proportion these various elements in the seal so that the larger portion of the force urging the sleeve into sealing engagement or even substantially all of it can be provided by the fluid under pressure, and so that the pressure between the sealing surfaces can be kept within proper limits so that excessive resistance to normal rotation is not encountered.

Many of the advantages of the present invention have already been indicated in the foregoing description. In general it may be pointed out that this seal is very simple in construction and operation, easy to install and remove, is highly effective in sealing under a wide variety of different conditions, and can maintain effective sealing even where a shaft is subject to severe end thrust or run-out or other irregular movements.

It is apparent that many widely different embodiments of this invention may be made without departing from the spirit and scope thereof, and therefore it is not intended to be limited except as in the appended claims.

This application is a continuation-in-part of my application Serial No. 785,689, filed November 13, 1947, now abandoned.

I claim:

1. A shaft seal comprising a pair of relatively rotatable annular members, a floating sleeve telescoping into and non-rotatably connected to one of said annular members, the inner surface of said one member and the outer surface of said sleeve being spaced apart radially to permit said sleeve to occupy a position in which its axis is an angle with respect to the axis of said annular member, a sealing surface on said sleeve, a sealing surface on the other of said annular members cooperating with the sealing surface on said sleeve, a plurality of annularly spaced spring means mounted between said sleeve and said one member to urged the sealing surface on said sleeve into sealing engagement with the sealing surface on said annular member and an O-ring packing member interposed between the overlapping portions of said telescopically overlapping sleeve and member to prevent fluid from escaping between said overlapping portions, one of the juxtaposed surfaces of said member and said sleeve telescoped therein having an annular groove formed therein adjacent the axial end of the part, said O-ring being seated in said groove to maintain said O-ring in place and the said surfaces adjacent the edge of said groove remote from the said axial end being at minimum relative radial spacing with very close clearance therebetween and less than the relative spacing at more remote points.

2. A shaft seal comprising a pair of relatively rotatable annular members, a floating sleeve telescoping into and non-rotatably connected to one of said annular members, the inner surface of said one member and the outer surface of said sleeve being spaced apart radially to permit said sleeve to occupy a position in which its axis is an angle with respect to the axis of said annular member, a sealing surface on said sleeve, a sealing surface on the other of said annular members cooperating with the sealing surface on said sleeve, a plurality of annularly spaced spring means mounted between said sleeve and said one member to urge the sealing surface on said sleeve into sealing engagement with the sealing surface on said annular member and an O-ring packing member interposed between the overlapping portions of said telescopically overlapping sleeve and member to prevent fluid from escaping between said overlapping portions, the surface of said member juxtaposed to a surface of said sleeve having an annular groove formed therein adjacent the axial end of said member, said O-ring being seated in said groove to maintain said O-ring in place and the said surfaces adjacent the edge of said groove remote from the said axial end being at minimum relative radial spacing with very close clearance therebetween and less than the relative spacing at more remote points.

3. A shaft seal comprising a pair of relatively rotatable annular members, a floating sleeve telescoping into and non-rotatably connected to one of said annular members, the inner surface of said one member and the outer surface of said sleeve being spaced apart radially to permit said sleeve to occupy a position in which its axis is at an angle with respect to the axis of said annular member, a sealing surface on said sleeve, a sealing surface on the other of said annular members cooperating with the sealing surface on said sleeve, a plurality of annularly spaced spring means mounted close to the surface of the shaft being sealed and between said said sleeve and said one member to urge the sealing surface on said sleeve into sealing engagement with the sealing surface on said annular member and an O-ring packing member interposed between the overlapping portions of said telescopically overlapping sleeve and member to prevent fluid from escaping between said overlapping portions, the surface of said member juxtaposed to a surface of said sleeve having an annular groove formed therein adjacent the axial end of said member, said O-ring being seated in said groove to maintain said O-ring in place and the said surfaces adjacent the edge of said groove remote from the said axial end being at minimum relative radial spacing with very close clearance therebetween and less than the relative spacing at more remote points.

4. A shaft seal comprising a pair of relatively rotatable annular members, a floating sleeve telescoping into and non-rotatably connected to one of said annular members which rotates with said shaft, the inner surface of said one member and the outer surface of said sleeve being spaced apart radially to permit said sleeve to occupy a position in which its axis is an angle with respect to the axis of said annular member, a sealing surface on said sleeve, a sealing surface on the other of said annular members cooperating with the sealing surface on said sleeve, a plurality of annularly spaced spring means mounted close to the surface of the shaft being sealed and between said sleeve and said one member to urge the sealing surface on said sleeve into sealing engagement with the sealing surface on said annular member and an O-ring packing member interposed between the overlapping portions of said telescopically overlapping sleeve and member to prevent fluid from escaping between said overlapping portions, the surface of said member juxtaposed to a surface of said sleeve having an annular groove formed therein adjacent the axial end of said member, said O-ring being seated in said groove to maintain said O-ring in place and the said surfaces adjacent the edge of said groove remote from the said axial end being at minimum relative radial spacing with very close clearance therebetween and less than the relative spacing at more remote points.

5. A shaft seal as claimed in claim 1, wherein the floating sleeve includes means responsive to the pressure of the fluid being sealed to urge the sealing surface of said sleeve into sealing engagement with the sealing surface on the annular member and wherein the said spring means and pressure responsive means are relatively proportioned and mounted so that substantially all the force urging said sleeve into sealing engagement under normal operating conditions is provided by the pressure responsive means.

6. A shaft seal as claimed in claim 2, wherein the floating sleeve consists of a hollow cylindrical portion provided with an annular flange extending radially outwardly from one end thereof with the said annular flange forming a sealing surface on one face thereof and an opposed surface responsive to the pressure of the fluid being sealed and operating to urge the sealing surface into sealing engagement with the sealing surface on the annular member.

WILFRED M. COOPMAN.

References Cited in the file of this patent

UNITED STATES PATENTS

| Number | Name | Date |
|---|---|---|
| 1,025,884 | Schmitt | May 7, 1912 |
| 1,927,543 | Doyle | Sept. 19, 1933 |
| 2,010,930 | Rowe | Aug. 13, 1935 |
| 2,111,200 | Amourelle | Mar. 15, 1938 |
| 2,363,110 | Krug | Nov. 21, 1944 |
| 2,370,471 | Karlberg | Feb. 27, 1945 |

FOREIGN PATENTS

| Number | Country | Date |
|---|---|---|
| 300,501 | Germany | of 1917 |